United States Patent [19]

Sato et al.

[11] Patent Number: 4,801,767

[45] Date of Patent: Jan. 31, 1989

[54] COORDINATE INPUTTING SHEET WITH AUXILIARY ELECTRODES PROMOTING ACCURACY OF POSITIONAL DETECTION

[75] Inventors: Hideki Sato, Takatsuki; Haruyuki Koizumi, Kyoto; Shinichi Hashizume, Kasatusu; Koichi Omae, Kyoto, all of Japan

[73] Assignee: Omron Tateisi Electronics Co., Kyoto, Japan

[21] Appl. No.: 55,946

[22] Filed: Jun. 1, 1987

[30] Foreign Application Priority Data

Jun. 6, 1986 [JP] Japan .................................. 61-132262

[51] Int. Cl.$^4$ ............................................. G08C 21/00
[52] U.S. Cl. ...................................................... 178/18
[58] Field of Search ..................... 178/18, 19, 20, 87; 340/706; 364/709

[56] References Cited

U.S. PATENT DOCUMENTS

3,911,215 10/1975 Hurst ..................................... 178/18
4,745,242 5/1988 Koizumi ................................ 178/18

*Primary Examiner*—Stafford D. Schreyer
*Attorney, Agent, or Firm*—Stevens, Davis, Miller & Mosher

[57] ABSTRACT

In this coordinate inputting sheet, there are provided an X coordinate inputting sheet for detecting an X coordinate and a Y coordinate inputting sheet for detecting a Y coordinate. These X coordinate and Y coordinate inputting sheets are laid together with their conducting surfaces mutually confronting one another. An insulating projection is provided between the X coordinate inputting sheet and the Y coordinate inputting sheet in order to space apart their opposing conducting surfaces. Auxiliary electrodes extend substantially along equipotential directions of at least one of the X and Y coordinate inputting sheets adjacent to the insulating projection. These auxiliary electrodes may optionally pass on either side of the insulating projection, and in such a case they may be substantially straight or may be curved away from the insulating projection; or, alternatively, the insulating projection may be located on one of the auxiliary electrodes, which may be enlarged to form a disk shaped portion around the insulating projection. In this case, a one of the auxiliary electrodes lying next to the one of the auxiliary electrodes on which the insulating projection is located may be shaped as straight, or alternatively it may be shaped as bowed away from the insulating projection.

6 Claims, 6 Drawing Sheets

COORDINATE INPUTTING SHEET WITH AUXILIARY ELECTRODES PROMOTING ACCURACY OF POSITIONAL DETECTION

BACKGROUND OF THE IVNENTION

The present invention relates to a coordinate inputting sheet; more particularly the present invention relates to such a coordinate inputting sheet which is suitable for being incorporated into a so called digitizer for inputting hand written letters and/or graphics; and even more particularly the present invention relates to such a coordinate inputting sheet, which is suitable for being incorporated into a so called digitizer for inputting hand written letters and/or graphics into, for example, a computer system, and which is also suitable for designating an area that is to be copied in, for example, a photo copying machine.

The present inventors wish hereby to attract the attention of the examining authorities to copending patent application Ser. No. 056892, filed June 3, 1987, which may be considered to be material to the examination of the present patent application.

Figure 6:
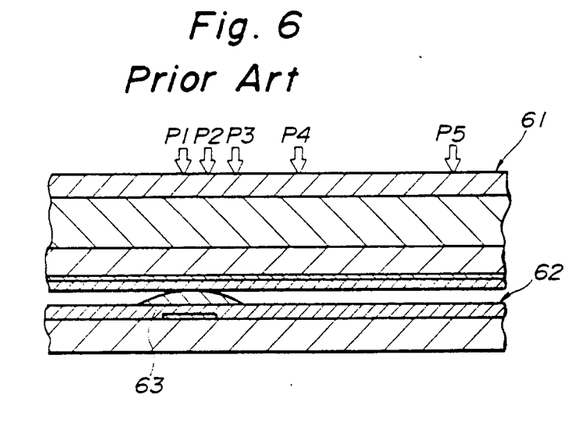
FIG. 6, which relates to the prior art and is similar to FIG. 1 relating to the first preferred embodiment of the coordinate inputting sheet of the present invention, shows a partial transverse sectional view of a prior art type coordinate inputting sheet.

In the prior art, there have been proposed various types of coordinate inputting sheet for a digitizer for a computer system or the like. Such a prior art type coordinate inputting sheet is illustrated in FIG. 6 of the accompanying drawings in sectional view. In this figure, the reference symbol 61 denotes a X coordinate inputting sheet, which has a resistive surface on its lower side as seen in the figure, and which has a pair of electrodes, not particularly shown, laid along its opposite edges and in contact with opposite edges of said resistive surface. And, similarly, the reference symbol 62 denotes a Y coordinate inputting sheet, which has a similar resistive surface on its upper side as seen in the figure and a similar pair of electrodes, not particularly shown, laid along its opposite edges and in contact with opposite edges of said resistive surface. These two X and Y coordinate inputting sheets 61 and 62 are laid together in a mutually skew perpendicular relationship, although this feature is not particularly shown in this figure.

With such a coordinate inputting sheet, when a tip of a special pen touches the upper or outside surface of the X coordinate inputting sheet 61 and presses on it, while at the same time certain voltages are applied between the electrodes of the X coordinate inputting sheet 61 and also between the electrodes of the Y coordinate inputting sheet 62, then divided voltages will be produced respectively from said X coordinate inputting sheet 61 and said Y coordinate inputting sheet 62 as X and Y coordinate information.

Figure 7:
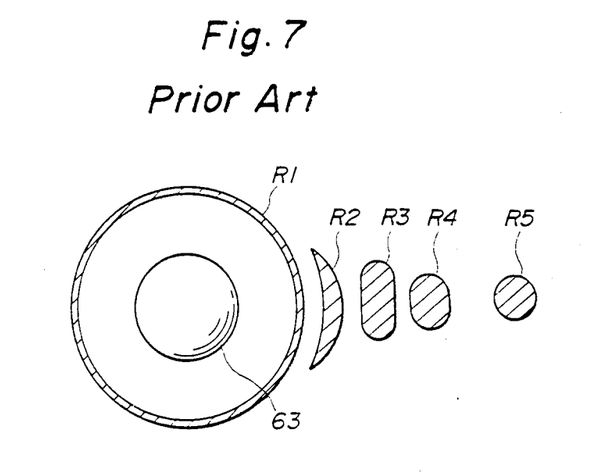
FIG. 7, which also relates to the prior art, shows mutual contact areas R1, R2, R3, R4, and R5 between the resistive surfaces of the X coordinate inputting sheet and of the Y coordinate inputting sheet of the prior art type coordinate inputting sheet of FIG. 6, induced by pressure on the points of the upper surface of said X coordinate inputting sheet designated in FIG. 6 as P1, P2, P3, P4, and P5 respectively.

Further, in order to prevent the resistive surfaces of the X coordinate inputting sheet 61 and of the Y coordinate inputting sheet 62 coming into contact with one another in the absence of pen pressure, a plurality of insulating projections 63 are typically provided between said resistive surfaces of the X coordinate inputting sheet 61 and of the Y coordinate inputting sheet 62, as shown in FIG. 6. When one or the other of the points on the upper surface of the X coordinate inputting sheet 61 which are designated in FIG. 6 as P1, P2, P3, P4, and P5 is pressed with the appropriate pressure pen, then this point may be determined according to the different resistivity entailed through the correspondingly induced contact areas R1, R2, R3, R4, and R5 of the resistive surfaces of the X coordinate inputting sheet 61 and of the Y coordinate inputting sheet 62 which are mutually contacted together, as shown in FIG. 7.

There is however a problem with such a prior art type coordinate inputting sheet, in that, when the point P1 on the upper surface of the X coordinate inputting sheet 61 corresponding to the dead center point of the insulating projection 63 is pressed, then this pressure is obstructed by said insulating projection 63, and a contact area R1 is induced between the resistive surfaces of the X coordinate inputting sheet 61 and of the Y coordinate inputting sheet 62, said contact area R1 naturally not being at the dead center point of the insulating projection 63. This will typically produce an erroneous reading from this coordinate inputting sheet, regarding the inputted coordinates of the pressure point. In such a case, the obtained X and Y coordinate information may well be incorrect.

SUMMARY OF THE INVENTION

The inventors of the present invention have considered the various problems detailed above.

Accordingly, it is the primary object of the present invention to provide a coordinate inputting sheet, which avoids the problems detailed above.

It is a further object of the present invention to provide such a coordinate inputting sheet, which prevents the production of a spurious or erroneous input indication, if and when the user should press upon said coordinate inputting sheet in a position corresponding to an insulating projection provided as described above for keeping separate the resistive surfaces of the X coordinate inputting sheet and the Y coordinate inputting sheet thereof.

It is a further object of the present invention to provide such a coordinate inputting sheet, which can improve the accuracy of positional identification and detection.

It is a further object of the present invention to provide such a coordinate inputting sheet, which can always produce valid positional information.

According to the most general aspect of the present invention, these and other objects are attained by a coordinate inputting sheet, comprising: an X coordinate inputting sheet for detecting an X coordinate and a Y coordinate inputting sheet for detecting a Y coordinate, said X coordinate inputting sheet and said Y coordinate inputting sheet being laid together with conducting surfaces thereof mutually confronting one another; an insulating projection provided between said X coordinate inputting sheet and said Y coordinate inputting sheet as means for spacing apart said opposing conducting surfaces thereof; and auxiliary electrodes extending substantially along equipotential directions of at least one of said coordinate inputting sheets adjacent to said insulating projection. And, more particularly, said auxiliary electrodes may pass on either side of said insulating projection, and may be substantially straight or may be curved away from it; or, alternatively, said insulating projection may be located on one of said auxiliary electrodes, which is enlarged to form a disk shaped portion around said insulating projection. In such a case, a one of said auxiliary electrodes lying next to said one of said auxiliary electrodes on which said insulating projection is located may be shaped as straight, or alternatively may be shaped as bowed away from said insulating projection.

According to such a coordinate inputting sheet as specified above, even when a point on the sheet corresponding to the insulating projection is pressed for inputting coordinates, nevertheless, according to the provision of the auxiliary electrodes, accurate positional information related thereto can be detected, as will be explained later in this specification. Thereby, loss of measurement accuracy can be prevented, and the production of a spurious or erroneous input indication, if and when the user should press upon said coordinate inputting sheet at said point corresponding to said insulating projection, is positively prohibited; and, thus, inputting of correct positional information into a computer or the like coupled to this coordinate inputting sheet of the present invention is made possible.

BRIEF DESCRIPTION OF THE DRAWINGS

The present invention will now be described with respect to the preferred embodiments thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and so on in the figures relating to one preferred embodiment, and like parts and gaps and spaces and so on in the figures relating to different preferred embodiments; and:

DESCRIPTION OF THE PREFERRED EMBODIMENTS

The present invention will now be described with reference to the preferred embodiments thereof, and with reference to the figures.

THE FIRST PREFERRED EMBODIMENT

Figure 1:
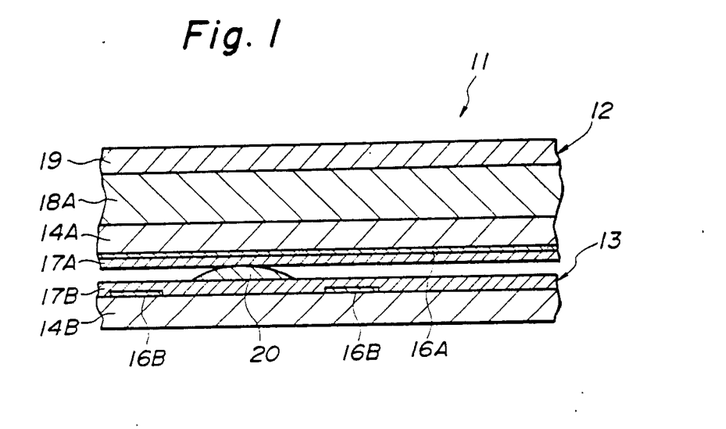
FIG. 1 is a partial transverse sectional view of the first preferred embodiment of the coordinate inputting sheet of the present invention.
Figure 2:
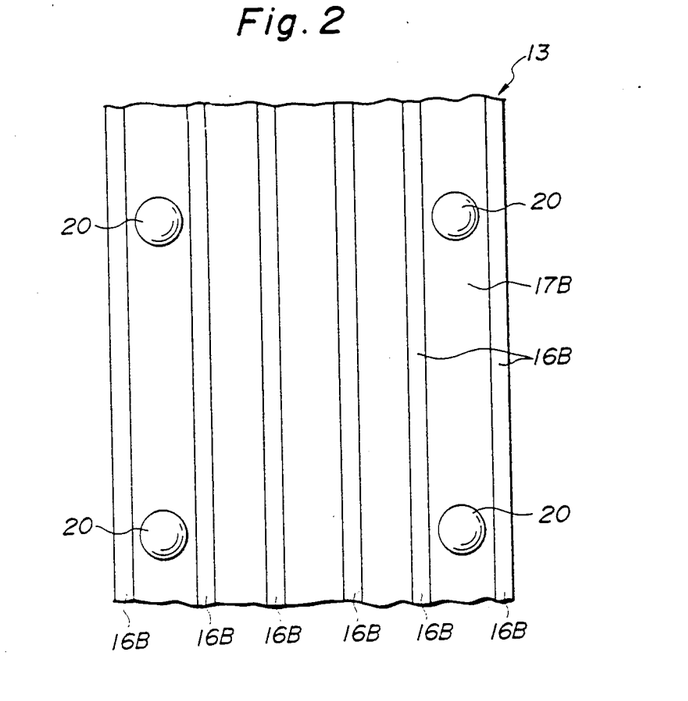
FIG. 2 is a partial plan view of a Y coordinate inputting sheet included in said first preferred embodiment.
Figure 3:
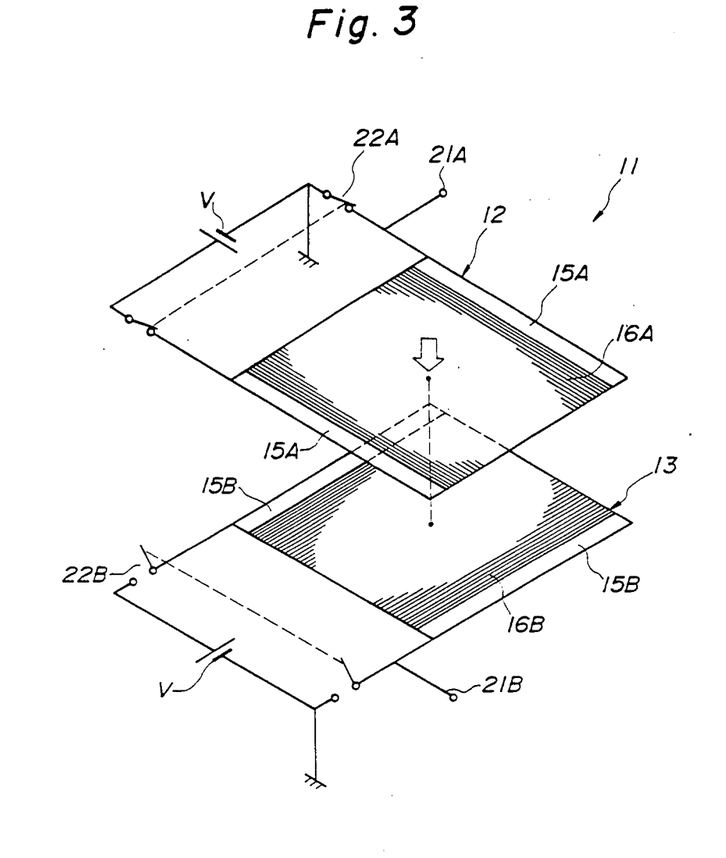
FIG. 3 is an exploded perspective view showing the overall physical construction of said first preferred embodiment of the coordinate inputting sheet of the present invention.

FIGS. 1 through 3 relate to the first preferred embodiment of the coordinate inputting sheet of the present invention, and among these figures FIG. 1 is a partial transverse sectional view of said first preferred embodiment of the coordinate inputting sheet of the present invention similar to FIG. 6 which related to the prior art described above, while FIG. 2 is a partial plan view thereof and FIG. 3 is a general exploded perspective view thereof. This first preferred embodiment comprises an X coordinate inputting sheet 12 for detecting the X coordinate of a point the coordinates of which it is desired to input, and a Y coordinate inputting sheet 13 for detecting the Y coordinate of said point the coordinates of which it is desired to input.

The X coordinate inputting sheet 12 comprises a flexible rectangular insulating sheet 14A which may be made of polyester film or the like, and which is provided with a pair of linear edge electrodes 15A laid along two of its opposite and parallel edges by screen printing with silver paste or by a like process, and further comprises a plurality of auxiliary electrodes designated by the reference numerals 16A, which may be formed of a linear electroconductive material such as copper, and which extend in a mutually parallel relationship with the two parallel edge electrodes 15A. In the case of this first preferred embodiment of the coordinate inputting sheet of the present invention, these auxiliary electrodes 16A are straight. And a layer 17A of resistive material, which may be carbon resin, is uniformly printed over the top surface of the flexible rectangular insulating sheet 14A carrying the auxiliary electrodes 16A. Thereby, the provision of these auxiliary electrodes 16A, the equipotential performance of the X coordinate inputting sheet 12 is improved, and the uniformity of the resistive property associated with the resistive layer 17A laid on said X coordinate inputting sheet 12 is improved, as is the linearity of the distribution of the current flowing through said resistive layer 17A. And the upper surface as seen in FIG. 1 of this X coordinate inputting sheet 12 is covered with a cover layer 18 and a top layer 19 suitable for being pressed by a pen or the like for inputting hand written material such as a text or graphics.

Similarly, the Y coordinate inputting sheet 13 comprises a flexible rectangular insulating sheet 14B which again may be made of polyester film or the like, and which is provided with a pair of linear edge electrodes 15B laid along two of its opposite and parallel edges again by screen printing with silver paste or by a like process, and further comprises a plurality of auxiliary electrodes designated by the reference numerals 16B, which again may be formed of a linear electroconductive material such as copper, and which extend in a mutually parallel relationship with the two parallel edge electrodes 15B. In the case of this first preferred embodiment of the coordinate inputting sheet of the present invention, these auxiliary electrodes 16B also are straight, like the auxiliary electrodes 16A of the X coordinate inputting sheet 12. And a layer 17B of resistive material, which again may be carbon resin, is uniformly printed over the top surface of the flexible rectangular insulating sheet 14B carrying the auxiliary electrodes 16B. Thereby, by the provision of these auxiliary electrodes 16B, the equipotential performance of the Y coordinate inputting sheet 13 is likewise improved, and the uniformity of the resistive property associated with the resistive layer 17B laid on said Y coordinate inputting sheet 13 is likewise improved, as is the linearity of the distribution of the current flowing through said resistive layer 17B.

The X coordinate inputting sheet 12 and the Y coordinate inputting sheet 13 are laid together, as shown in the figures, with their respective layers 17A and 17B confronting one another but not actually in contact, and with the two parallel edge electrodes 15A of the X coordinate inputting sheet 12 extending skew perpendicular to the two parallel edge electrodes 15B of the Y coordinate inputting sheet 13. And the resistive layers 17A and 17B of the X coordinate inputting sheet 12 and the Y coordinate inputting sheet 13 respectively are at this time kept from coming into mutual contact by the provision of a plurality of insulating projections 20, which are evenly distributed over the upper surface as seen in FIG. 1 of the Y coordinate inputting sheet 13, and are, as shown in the plan view of said Y coordinate inputting sheet 13 shown in FIG. 2, located between the auxiliary electrodes 16B laid on said Y coordinate inputting sheet 13. Thus, in this first preferred embodiment of the coordinate inputting sheet of the present invention, the auxiliary electrodes 16B on the Y coordinate inputting sheet 13 are arranged to be straight and to pass on either side of each of the insulating projections 20, so that the input error is reduced when a point on the top layer 19 of the X coordinate inputting sheet 12, directly over and corresponding to the center of any one of said insulating projections 20, is pressed by a pen for input purposes.

During the use of this first preferred embodiment of the coordinate inputting sheet of the present invention, as illustrated in FIG. 3, a voltage V, which conveniently may be approximately 5 volts, is applied between the edge electrodes 15A of the X coordinate inputting sheet 12, and alternatively similarly a similar voltage V is applied between the edge electrodes 12B and 13B of the Y coordinate inputting sheet 13, according to the switching over of switches 22A and 22B. The reference numerals 21 denote voltage take off points from the FIG. 3 circuit. And, as pen pressure is applied to the top layer 19 of the X coodinate inputting sheet 12 at a particular so called input point, the X coordinate of said input point on the X coordinate inputting sheet 12 and the Y coordinate of said input point on the Y coordinate inputting sheet 13 are detected by a circuit not particularly shown or detailed, according to the resistive values presented by the resistive layers 17A and 17B of the X coordinate inputting sheet 12 and Y coordinate inputting sheet 13, and thereby the point of pen pressure can be determined in a per se known manner.

By the provision of the auxiliary electrodes 16A and 16B under the resistive layers 17A and 17B of the X coordinate inputting sheet 12 and the Y coordinate inputting sheet 13 respectively, it is ensured that, even when pen pressure is applied to an input point on the top layer 19 of the X coordinate inputting sheet 12 which directly corresponds to the center of one of the insulating projections 20, and then the point of pressure, i.e. the input point, shifts to a just adjacent point, since one or the other of the auxiliary electrodes 16 arranged on either side of said projection 20 will be depressed, the point of pen pressure can be accurately identified within a certain acceptable tolerance range.

THE SECOND PREFERRED EMBODIMENT

Figure 4A:
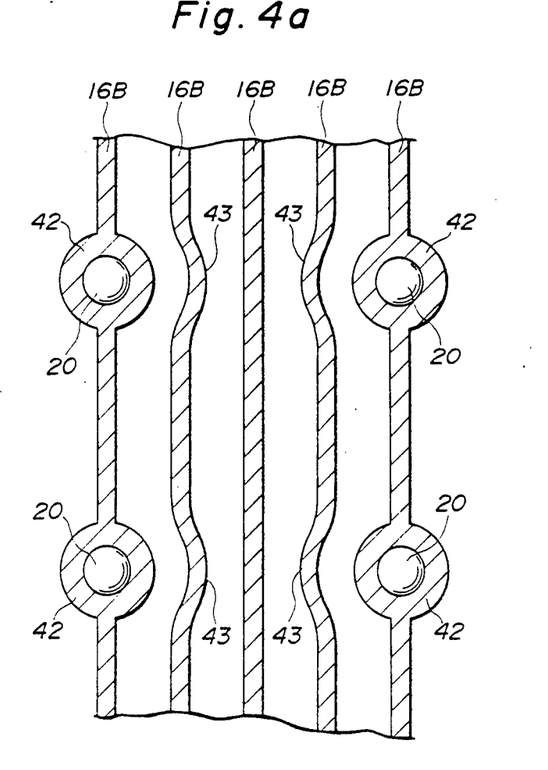
FIG. 4(a) is similar to FIG. 2 for the first preferred embodiment, being a partial plan view of a Y coordinate inputting sheet included in the second preferred embodiment of the coordinate inputting sheet of the present invention.

A partial plan view of the Y coordinate inputting sheet 13 of the second preferred embodiment of the coordinate inputting sheet of the present invention is shown in FIG. 4(a), in a manner similar to FIG. 2 for the first preferred embodiment. In this figure, parts and gaps and spaces and so on which correspond to analogous parts and gaps and spaces and so on of the first preferred embodiment are denoted by reference numerals like to those utilized in the figures relating to said first preferred embodiment.

In this second preferred embodiment of the coordinate inputting sheet of the present invention, the insulating projections 20 are provided right on some of the auxiliary electrodes 16B of the Y coordinate inputting sheet 13. In this case, at these points of said auxiliary electrodes 16B at which said insulating projections 20 are located, said auxiliary electrodes 16B are enlarged to form circular portions 42, with a radius corresponding to the radius of error that is considered allowable. And further, particularly in this second preferred embodiment of the coordinate inputting sheet of the present invention, the portions of those others of the auxiliary electrodes 16B which are adjacent to said ones of said auxiliary electrodes 16B at which said insulating projections 20 are located, corresponding to these circular portions 42, are bowed away from said circular portions 42 in bow shapes 43.

The same functions and advantages are available with this second preferred embodiment of the coordinate inputting sheet of the present invention, as were available with the first preferred embodiment, but improved; and accordingly detailed description thereof will be eschewed in the interests of brevity of explanation.

THE THIRD PREFERRED EMBODIMENT

Figure 4B:
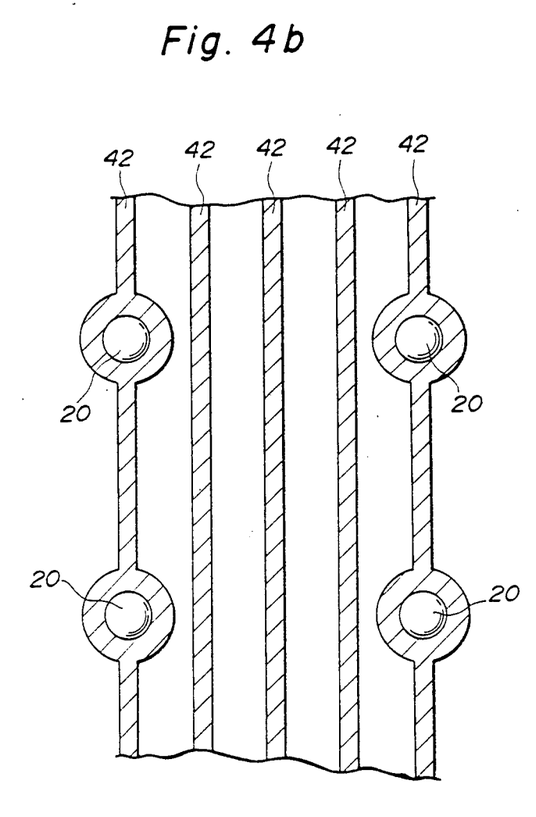
FIG. 4(b) is similar to FIG. 2 for the first preferred embodiment and to FIG. 4(a) for the second preferred embodiment, being a partial plan view of a Y coordinate inputting sheet included in the third preferred embodiment of the coordinate inputting sheet of the present invention.

A partial plan view of the Y coordinate inputting sheet 13 of the third preferred embodiment of the coordinate inputting sheet of the present invention is shown in FIG. 4(b), in a manner similar to FIG. 2 for the first preferred embodiment and FIG. 4(a) for the second preferred embodiment. In this figure, parts and gaps and spaces and so on which correspond to analogous parts and gaps and spaces and so on of the first and the second preferred embodiments are denoted by reference numerals like to those utilized in the figures relating to said first and second preferred embodiments.

In this third preferred embodiment of the coordinate inputting sheet of the present invention, as in the second preferred embodiment, the insulating projections 20 are provided right on some of the auxiliary electrodes 16B of the Y coordinate inputting sheet 13. Again in this case, at these points of said auxiliary electrodes 16B at which said insulating projections 20 are located, said auxiliary electrodes 16B are enlarged to form circular portions 42, with a radius corresponding to the radius of error that is considered allowable. On the other hand, particularly in this third preferred embodiment of the coordinate inputting sheet of the present invention, the portions of those others of the auxiliary electrodes 16B which are adjacent to said ones of said auxiliary electrodes 16B at which said insulating projections 20 are located, corresponding to these circular portions 42, are not bowed away from said circular portions 42 in any bow shapes as was the case in the second preferred embodiment, but are straight.

The same functions and advantages are available with this third preferred embodiment of the coordinate inputting sheet of the present invention, as were available with the second preferred embodiment; and accordingly detailed description thereof will again be eschewed in the interests of brevity of explanation. In fact, the uniformity of equipotential compensation is slightly deteriorated from the performance of the FIG. 4(a) second preferred embodiment, but the actual production of the bowed shapes 43 of said second preferred embodiment is troublesome in practice, and it has been found by experiment that the FIG. 4(b) third preferred embodiment offers acceptable performance.

THE FOURTH PREFERRED EMBODIMENT

Figure 5:
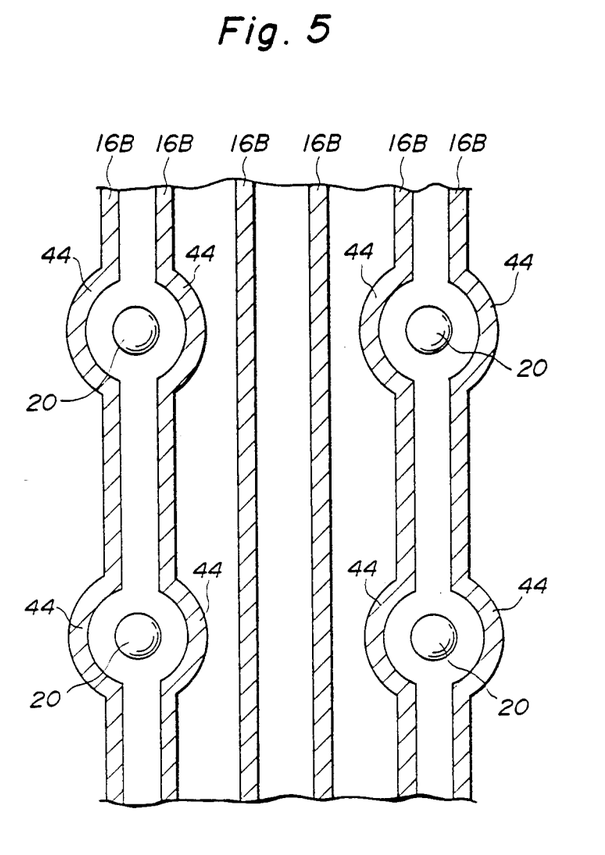
FIG. 5 is similar to FIG. 2 for the first preferred embodiment and to FIGS. 4(a) and 4(b) for the second and the third preferred embodiments, being a partial plan view of a Y coordinate inputting sheet included in the fourth preferred embodiment of the coordinate inputting sheet of the present invention.

A partial plan view of the Y coordinate inputting sheet 13 of the fourth preferred embodiment of the coordinate inputting sheet of the present invention is shown in FIG. 5, in a manner similar to FIG. 2 for the first preferred embodiment and FIGS. 4(a) and 4(b) for the second and third preferred embodiments respectively. In this figure, parts and gaps and spaces and so on which correspond to analogous parts and gaps and spaces and so on of the first through third preferred embodiments are denoted by reference numerals like to those utilized in the figures relating to said first through third preferred embodiments.

In this fourth preferred embodiment of the coordinate inputting sheet of the present invention, by contrast to the second and the third preferred embodiments, the insulating projections 20 are provided between pairs of the auxiliary electrodes 16B of the Y coordinate inputting sheet 13. In this case, the portions of those of said auxiliary electrodes 16B which are adjacent to said insulating projections 20 are curved away from said insulating projections 20 is semicircular shapes, again over ranges corresponding to the range of error that is considered acceptable. By thus arranging the auxiliary electrodes 16B, the accuracy of equipotential compensation can be further improved, and the accuracy of positional detection in the vicinity of the insulating projections 20 can be enhanced. The same functions and advantages are available with this fourth preferred embodiment of the coordinate inputting sheet of the present invention, as were available with the other preferred embodiments described; and accordingly detailed description thereof will again be eschewed in the interests of brevity of explanation.

CONCLUSION

Thus, as described above, even when an input point in the vicinity of one of the insulating projections 20 is pressed by the pen for input of its coordinates, and the point of pressure has shifted to the surroundings of said one of said insulating projections 20 by being obstructed by said one of said insulating projections 20, since the auxiliary electrodes 16B are positioned along equipotential lines in positions shifted from the point of pressure, thereby the point of pressure can be adequately detected. As a result, the ill effects of the shifting of the point of pressure caused by the insulating projections 20 are substantially completely eliminated, and the coordinates of the input point can be inputted, for example to a computer coupled to this coordinate inputting sheet according to the present invention, with great accuracy.

Although the present invention has been shown and described in terms of the preferred embodiments thereof, and with reference to the appended drawings, it should not be considered as being particularly limited thereby, since the details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the scope of the accompanying claims, which follow.

What is claimed is:

1. A coordinate inputting sheet, comprising: an X coordinate inputting sheet for detecting an X coordinate and a Y coordinate inputting sheet for detecting a Y coordinate, said X coordinate inputting sheet and said Y coordinate inputting sheet being laid together with conducting surfaces thereof mutually confronting one another; an insulating projection provided between said X coordinate inputting sheet and said Y coordinate inputting sheet as means for spacing apart said opposing conducting surfaces thereof; and auxiliary electrodes extending substantially along equipotential directions of at least one of said coordinate inputting sheets adjacent to said insulating projection.

2. A coordinate inputting sheet according to claim 1, wherein said auxiliary electrodes are substantially straight and pass on either side of said insulating projection.

3. A coordinate inputting sheet according to claim 1, wherein said insulating projection is located on one of said auxiliary electrodes, which is enlarged to form a disk shaped portion around said insulating projection.

4. A coordinate inputting sheet according to claim 3, wherein a one of said auxiliary electrodes lying next to said one of said auxiliary electrodes on which said insulating projection is located is shaped as straight.

5. A coordinate inputting sheet according to claim 3, wherein a one of said auxiliary electrodes lying next to said one of said auxiliary electrodes on which said insulating projection is located is shaped as bowed away from said insulating projection.

6. A coordinate inputting sheet according to claim 1, wherein those ones of said auxiliary electrodes which pass proximate to said insulating projection are curved away from said insulating projection.

* * * * *